United States Patent
Gibbon et al.

(10) Patent No.: US 9,569,333 B1
(45) Date of Patent: Feb. 14, 2017

(54) METHOD FOR RETRIEVING INFORMATION FROM PRESENTATIONS AND MEETINGS USING A NETWORK

(75) Inventors: David Crawford Gibbon, Lincroft, NJ (US); Lee Begeja, Gillette, NJ (US); Karrie Hanson, Westfield, NJ (US); Zhu Liu, Marlboro, NJ (US); Bernard S. Renger, New Providence, NJ (US); Murat Saraclar, Istanbul (TR); Behzad Shahraray, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1357 days.

(21) Appl. No.: 11/257,788

(22) Filed: Oct. 25, 2005

(51) Int. Cl.
G06F 3/00 (2006.01)
G06F 11/34 (2006.01)
G06F 3/0481 (2013.01)

(52) U.S. Cl.
CPC ......... *G06F 11/3414* (2013.01); *G06F 3/0481* (2013.01)

(58) Field of Classification Search
CPC .............................. G06F 3/0481; G06Q 10/10
USPC .......... 715/753, 704; 704/240, 246; 709/204
See application file for complete search history.

(56) References Cited

U.S. PATENT DOCUMENTS

| | | | |
|---|---|---|---|
| 6,317,716 B1 | 11/2001 | Braida et al. | |
| 6,640,145 B2 | 10/2003 | Hoffberg | |
| 6,785,369 B2 | 8/2004 | Diamond et al. | |
| 6,792,093 B2 | 9/2004 | Barak et al. | |
| 6,850,252 B1 | 2/2005 | Hoffberg | |
| 2002/0002584 A1* | 1/2002 | Takagi | G06Q 10/10 709/204 |
| 2004/0078188 A1* | 4/2004 | Gibbon et al. | 704/1 |
| 2005/0165934 A1* | 7/2005 | Rosenberg et al. | 709/227 |

* cited by examiner

*Primary Examiner* — Haoshian Shih
(74) *Attorney, Agent, or Firm* — Fay Kaplun & Marcin, LLP

(57) ABSTRACT

A method and system for processing recorded communications over a network provides a communication via a network to a recording server adapted for hosting a recordable meeting. The recording server includes a processor with a memory and communicates with the network and an identification code is provided for the recordable meeting along with text related to the communication, which is stored in data storage of the recording server. At least one pointer can be inserted during or after the meeting is recorded, forming a recorded meeting with at least one pointer mapped to the text of the recorded meeting. The recorded meeting with at least one pointer is then saved into the data storage that can be accessed by an interested user.

21 Claims, 2 Drawing Sheets

METHOD FOR RETRIEVING INFORMATION FROM PRESENTATIONS AND MEETINGS USING A NETWORK

FIELD

In certain aspects, the embodiments relate generally to a method and a system for retrieving information from presentations and meetings over a network.

BACKGROUND

Presently, there are systems and methods for recording and storing presentations and meetings. Due to the linear nature of the recording medium, navigating regions of interest in a particular recording is difficult and time-consuming for consumers. Consumers such as a businessperson or a student lose significant productivity time when they are required to search for a particular segment of a presentation or meeting, given the linear nature of the medium.

This time consuming problem for searching segments of a presentation, given the linear nature of the recording medium, has been confronted with applications such as distance learning or eLearning enabling authors to create indices to particular topics covered in the presentation. Indices allow users, such as students to navigate quickly to a region of interest in a recording medium to find data without having to spend time navigating through regions in which they are familiar. However, the use of indices to navigate a recording medium places a time consuming and manual burden on the creator to place indices on particular topics in the recording medium. The use of indices has a high cost, which is difficult to justify in environments with highly paid labor.

A need exists for a system and a method for end users to navigate quickly to a region of interest of a recorded presentation or recorded meeting over a network to a segment of a recorded presentation or recorded meeting that does not place a high, time-consuming burden on the creator of the recorded meeting or the recorded presentation.

Other solutions to the use of indices for navigating to an area of interest in a recorded presentation include an automated method for searching and browsing video and audio using automatic speech recognition (ASR). Using ASR has two main shortcomings: firstly, the accuracy of ASR is often a limiting factor for the task as ASR could record the spoken words incorrectly if a speaker has a lisp or an accent, and secondly, ASR requires a user to manually look through search terms to find what the user desires to hear. ASR becomes a significant problem when users are unaware of the topics discussed in the recorded presentation or recorded meeting. Trial and error becomes the only method, when using ASR, to determine the appropriate query terms. Transcription alignment or synchronization is a technique that often solves the problems of ASR errors, however, the cost of transcription alignment and synchronization is high in terms of manual time involved. To use transcription alignment or synchronization, after the meeting is recorded in a recording medium, the meeting is manually transcribed and a text document (file) is created. The file along with the recording media are used as inputs to a text synchronization algorithm the output of which is a data structure that indicates the location (temporal offset) in the recording medium of each word or sentence from the text. The data structure that indicates the location in the recording medium is stored in a database, and at retrieval time, users issue queries against the text and the corresponding recording medium is retrieved. In addition, using ASR creates a significant delay between the time that the recording of the meeting or presentation is made until the time that portions of the meeting can be retrieved.

A need exists for a system and a method that allows end users quick access, without long time delays, to the recordings of presentations and meetings after they occur using a network.

A large range of communication scenarios exists where potential economic and social values are not served by the existing authoring, retrieval and browsing schemes. A need exists for a method that is not time consuming nor entails a high cost in manual time involvement in the recordation and retrieval of data from a presentation or meeting via a network.

The present embodiments meet these needs.

SUMMARY

The embodiments are directed towards methods for storing and retrieving information from presentations and meetings over a network.

The embodied methods provide communication via a network to a recording server adapted for hosting a recordable meeting. The recording server provides an identification code for the recordable meeting and provides text relating to the communication to the data storage of the recording server. At least one pointer with a time stamp is placed into the recordable meeting forming a recorded meeting where the pointers map the text to the recorded meeting. The recorded meeting is then saved in the data storage. A user interface is created so that a user can play a portion of the recorded meeting by selecting at least one of the pointers of the recorded meeting. The recorded meeting can also be a presentation.

The embodiments are directed towards systems for recording and retrieving information from presentations and meetings over a network. The systems include computer means for storing a linearly progressing audio and/or visual communication where the computer means use a processor with a memory. One or more pointers are inserted into the linearly progressing audio and/or visual communication to identify at least one segment of the linearly progressing audio and/or visual communication.

BRIEF DESCRIPTION OF THE DRAWINGS

The detailed description will be better understood in conjunction with the accompanying drawings as follows.

Figure 1:
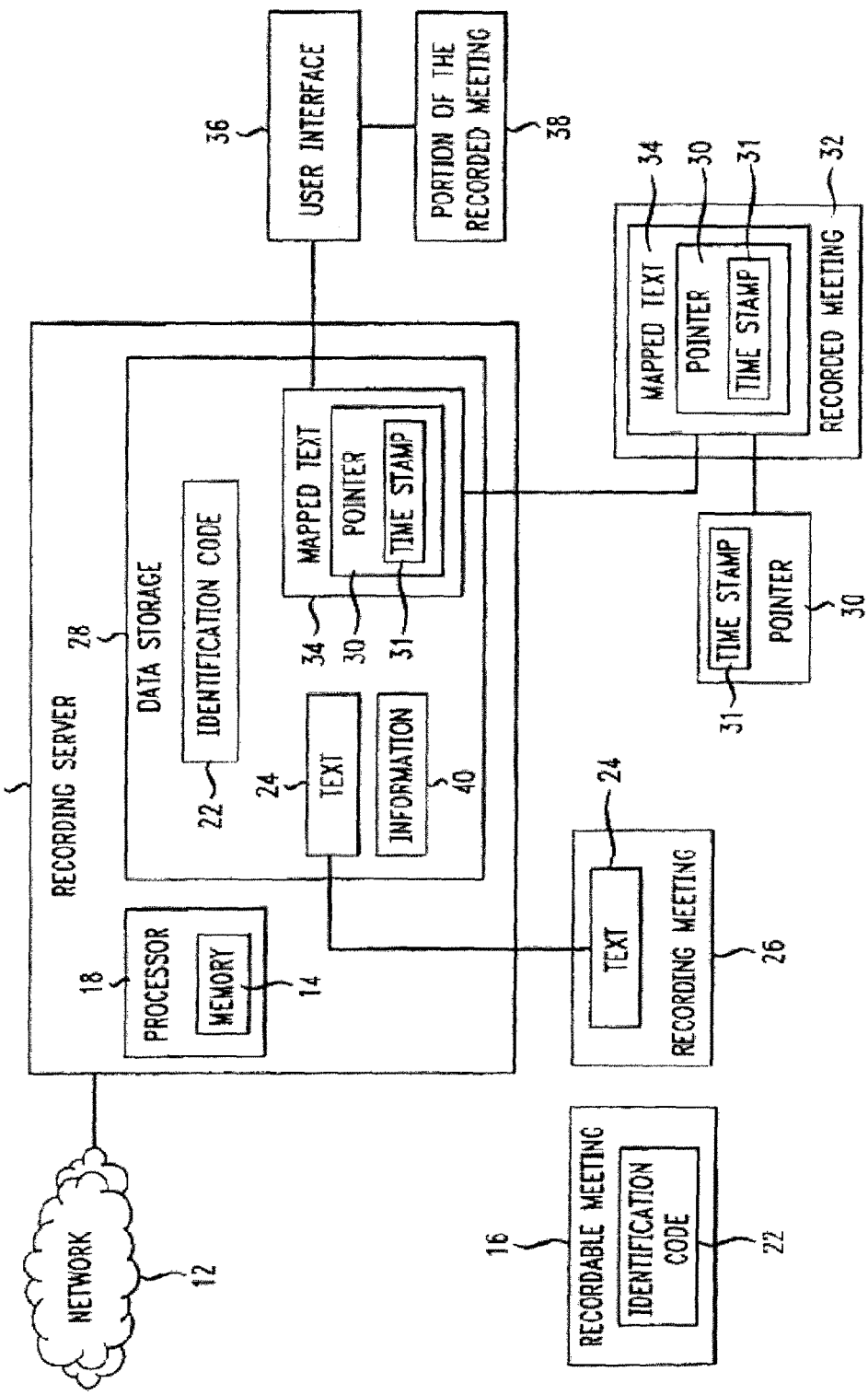
FIG. 1 is an example schematic for processing recorded communications over a network.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The embodiments relate to methods and systems for retrieving information from presentations and meetings over a network. The embodied systems and methods reduce the time for reviewing conference calls. The reduction of time is beneficial for persons, such as a businessperson or a student, where value can be measured in terms of productive time lost or hourly time lost for a particular task.

A large range of communication scenarios of potential economic and social values can be served with these embodied systems and methods. Examples of these scenarios include business communications, such as audio and video teleconferences, and technical presentations or talks. Although these communication scenarios are valuable to a select audience, the costs of manual or semi-automatic authoring are not justified so the value is not realized. The embodiments allow the user to author, retrieve, and browse the communication in a cost effective and time effective manner.

The systems include a network to transfer information between the recording server and the communication. The embodied methods utilize the systems and begin by providing a communication via a network to a recording server adapted for hosting a recordable meeting. The recording server includes a processor with a memory. Examples of networks include wide area networks, local area networks, the Internet, or Ethernet networks.

The communication can be provided at timed intervals or based on some other designated indicator, such as a specific date. Examples of communication include lecture material, verbal utterances (such as, an audio or video conference call), movies, music, television programs, and telecommunications for the deaf, or similar content sent via a network to a recording server.

The recording server in one embodiment can be a multipoint control unit that uses a teleconferencing bridge for adding multiple communications to the recordable meeting enabling multiple communications to occur simultaneously. Examples of teleconferencing bridge are telephone-based bridges and SIP-based bridges.

The recording server with a processor and a memory communicates throughout the network. The processor can communicate with data storage for saving the recordable meeting. The recording server can be a Dell PC, or some other high power computer with flash memory.

In processing the recorded communications over the network, an identification code is given to the recordable meeting. The identification code usable in this method can be a host code with an access number, a dialed number with conference identifier or a similar security code system. The identification code can be given by the user who establishes the recordable meeting or can be automatically generated when the meeting is recorded.

Text from the recording meeting can be stored in the data storage of the recording server. Optionally, the recordable meeting can be linked to content materials, such as a Power Point™ presentation, an agenda, a movie clip, or music. Additional content can be text, such as an abstract, an agenda, a document with images, text based meeting minutes, a video with text, or other text like material. The combination of the content and the recordable meeting can then be connected together in the data storage.

One or more pointers with a time stamp is mapped to one or more segments of audio from the recordable meeting forming a recorded meeting wherein the pointers map the text of the recorded meeting. The pointers can be inserted during the recording of the recordable meeting by an administrator of the meeting, or by a participant of the meeting, either before or after the meeting. Alternatively, the pointers can be inserted automatically by the processor during or after the recording of the recordable meeting using computer instructions stored in the data storage. The pointers can be saved in data storage. The data storage can be accessible to participants of the recorded meeting and others who have access to the network.

One embodiment is a method that allows a user interface to provide access to the recorded meeting. Examples of a user interface include a web browser, a personal digital assistant, a computer, a cellular phone, a telephone and combinations thereof. A portion of the recorded meeting can be searched using keywords to locate pointers in the stored text, and once located, the segment related to the pointer is played using the user interface to hear that portion of the recorded meeting or to see materials associated with that portion of the recorded meeting.

Computer instructions in the data storage use the processor in the recording server to create pointers to be placed in the text from the recording meeting. Keywords from the text associated with the recording meeting are used to insert pointers at locations where the keywords appear in the text to create a mapped text. The text can be generated using a voice to text recognition algorithm. Keywords can be generated after the recording is made by processing the text and using various algorithms to determine the most prevalently used words.

Colored segments can be used to further indicate relevant sections of the recording medium as a user runs the mouse over the lines of text.

The text can be an abstract, an agenda, a document with images, video with text, meeting minutes (such as, notes taken during a meeting by participants or audience members), or prepared presentation material (such as, a PowerPoint™ presentation). A sequence constraint can be imposed in which the order of the lines or sentences in the abstract or agenda must match the order of segments in the media with a one to one correspondence. In a less structured meeting, this constraint can be relaxed, or a one-to-many mapping of lines to media segments can be implemented.

Embodiments can be used for various types of communication. Examples of types of communication include a telephone call, a voice over IP call, a data call or a video call. The recordable meeting can be a conference call and the communication can be a plurality of telephone calls.

FIG. 1 depicts an embodiment of the system for processing recorded communications over a network. As depicted, the system, executable by a computer, can include linearly progressing audio and/or visual communication which is transferred via a network (12) to a recording server (14) adapted for hosting a recordable meeting (16). The recording server comprises a processor (18) with a memory (20). An identification code (22) is provided for the recordable meeting. Text (24) from a recording meeting (26) is stored in the data storage (28) of the recording server. At least one pointer (30) with a time stamp (31) pointing to the text is in the recorded meeting (32) forming a mapped text (34) with a pointer. A user interface (36) is used to provide access to the mapped text. A user is able to use the user interface to play a portion of the recorded meeting (38) using the user interface by selecting at least one pointer of the mapped text.

One embodiment is a system for retrieving information from presentations and meetings. The linearly progressing audio and/or visual communication is stored in the computer memory. A plurality of pointers in the recorded meeting enables playback of a segment of the communication beginning at the pointer. A user interface is used that topically indexes the communication and provides access to a segment of the communication by associating a selected topic with the pointer corresponding to the beginning of the topic.

Alternatively, a user can insert the pointers in real-time during the recording of the meeting.

Referencing back to FIG. 1, the network transfers the communication to the recording server (14). At the recording server, identification codes are generated from information (40) pertinent to the recorded media before the recording. Examples include meeting agendas and abstracts of technical talks. The type of information is intended to give a high-level overview of the presentation and is ideal for use in searching and browsing of the meeting. At the recorded meeting, pointers and time stamps are inserted into the recorded meeting and matched up with the text from the recording associated with the identification code (22). This information is stored in the data storage compartment of the recording server (28). A user interface is used by the user to play back a portion of the recorded meeting when needed (38).

The embodiments include computer readable medium having stored thereon a plurality of instructions, the plurality of instructions including instructions which, when executed by a processor, cause the processor to perform the embodied methods for processing recorded communications over a network.

Figure 2:
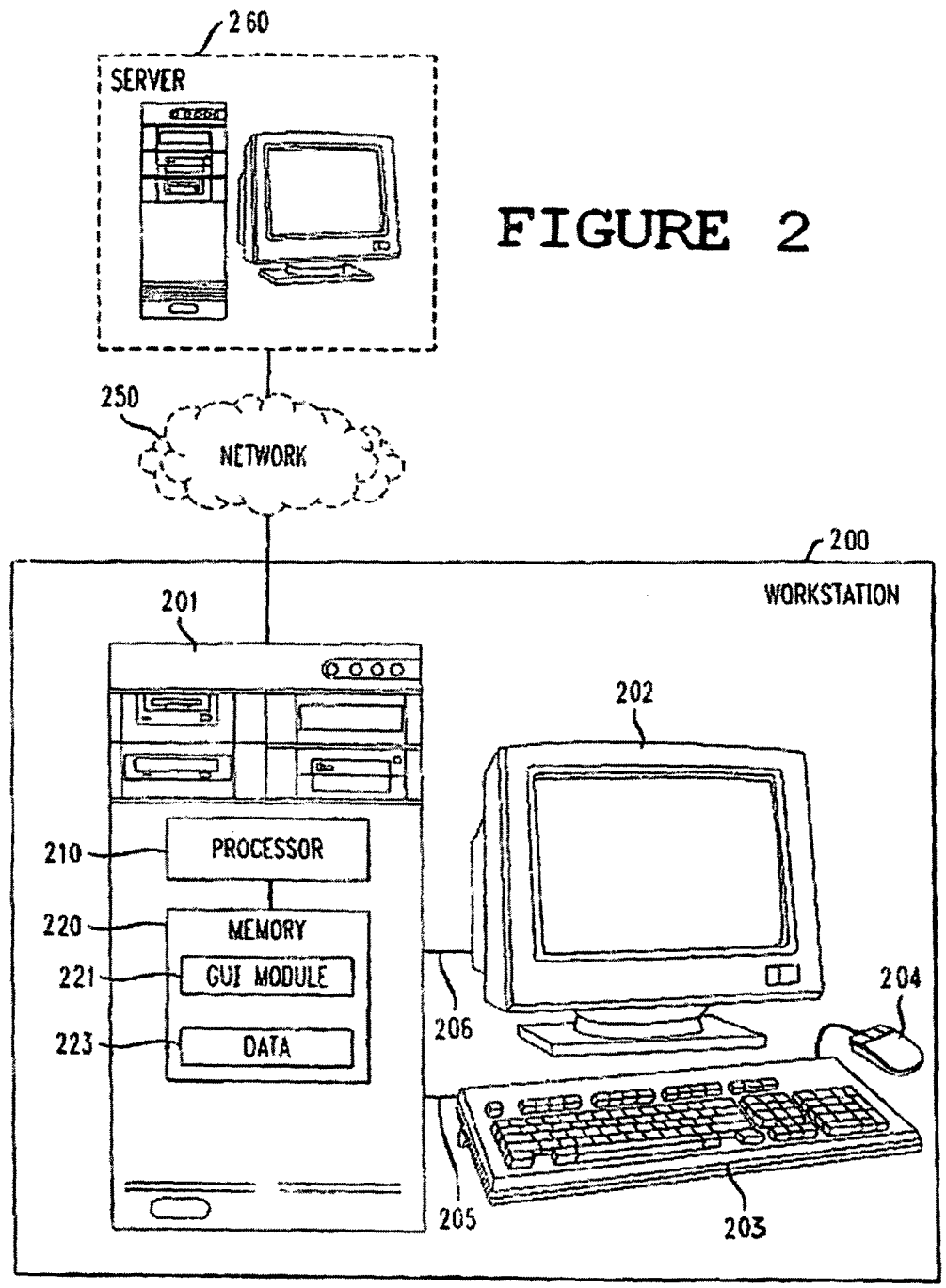
FIG. 2 depicts an illustration of a computer system to perform the embodied methods.

FIG. 2 depicts an illustration of a computer system to perform the embodied methods. A workstation 200 includes computer 201, which can be coupled to a video display 202 via an external graphics bus 206. The external graphics bus 206 can be an Advanced Graphics Port (AGP) compliant bus. The term "coupled" encompasses a direct connection, an indirect connection, or the like. Computer 201 in one embodiment includes a processor 210, such as the Pentium™ III processor manufactured by Intel Corp. of Santa Clara, Calif. In another embodiment, the processor 210 can be an Application Specific Integrated Circuit (ASIC). Computer 201 can include a memory 220 coupled to the processor. Memory 220 encompasses devices adapted to store digital information, such as Dynamic Random Access Memory (DRAM), Rambus™ DRAM (RDRAM), flash memory, a hard disk, an optical digital storage device, a combination thereof, etc. The computer 201 can be coupled to a keyboard 203 and a mouse 204 via an external computer bus 605. In one embodiment, the external computer bus 605 is a Universal Serial Bus (USB) compliant bus.

Memory 220 can include instructions adapted to be executed by the processor 210 to perform a method in accordance with an embodiment of the present invention. The term "instructions adapted to be executed" is meant to encompass any instructions that are ready to be executed in their present form (for example, machine code) by a processor, or require further manipulation (for example, compilation, decryption, decoding, or provided with an access code, etc.) to be ready to be executed by a processor (for example, processor 210). In one embodiment, the memory 220 can include a graphical user interface (GUI) module 221 to implement a graphical user interface.

In another embodiment, the workstation 200 is coupled to a server 260 via a network 250. Examples of network 250 include the internet, a WAN (wide area network), LAN (local area network), an intranet, a communications network, a computer network, a combination thereof, etc. In one embodiment, the server 260 is coupled to a storage device that typically stores data on a magnetic medium such as a magnetic disk. For example, the storage device may store application programs and associated data files/documents. Examples of documents include word processing documents, spreadsheet documents, HTML (Hypertext Markup Language) documents, and the like. Workstation 200 can access data stored in the storage device via server 260 and network 250. In an embodiment, server 260 can display information on display 202 by sending information signals to workstation 200 via network 250. Examples of display information include data a GUI component, a web page, and the like.

Data 223 can encompass hierarchical data, non-hierarchical data, and the like. Data 223 can be a document corresponding to a particular application such as a word processing document, a spreadsheet document, an HTML document, and the like.

Computer instructions adapted to be executed by a processor to perform the embodied methods are stored on a computer-readable medium and distributed as software. The computer-readable medium can be a device that stores digital information. For example, a computer-readable medium includes a portable magnetic disk, such as a floppy disk; or a Zip™ disk, manufactured by the Iomega Corporation of Roy, Utah (Zip™ is a registered trademark of Iomega Corporation); or a Compact Disk Read Only Memory (CD-ROM) as is known in the art for distributing software. The computer-readable medium can be distributed to a user that has a processor suitable for executing instructions adapted to be executed.

While these embodiments have been described with emphasis on the embodiments, it should be understood that within the scope of the appended claims, the embodiments might be practiced other than as specifically described herein.

What is claimed is:

1. A method for processing recorded communications over a network comprising:
   a. providing a communication via the network to a recording server adapted for hosting a recordable meeting, wherein the recording server comprises a processor with a memory;
   b. assigning an identification code for the recordable meeting, wherein the identification code is generated prior to the recordable meeting from information pertinent to the recordable meeting,
      wherein the information comprises abstracts of technical talks;
   c. forming a text from the recordable meeting and storing the text in a data storage, wherein the text is a transcript of the recordable meeting;
   d. inserting at least one pointer into the text to form a recorded meeting with at least one pointer, wherein the at least one pointer maps the text to form a mapped text, and wherein a location of the pointer is selected based on a content of the text;
   e. saving the mapped text and the identification code in the data storage; and
   f. playing back a portion of the recordable meeting using at least one pointer in the mapped text.

2. The method of claim 1, further comprising:
   g. generating a user interface to provide access to the mapped text.

3. The method of claim 1, further comprising:
   g. searching the mapped text using a search term to locate pointers associated with the search term.

4. The method of claim 1, wherein the inserting at least one pointer into the text is performed by a participant of the recordable meeting during the recording of the recordable meeting.

5. The method of claim 1, wherein the inserting at least one pointer into the text is performed by an administrator of the recordable meeting during the recording of the recordable meeting.

6. The method of claim 1, wherein the inserting at least one pointer into the text is performed automatically by the processor using computer instructions stored in the data storage during the recording of the recordable meeting.

7. The method of claim 1, wherein the inserting at least one pointer into the text is performed automatically by the processor using computer instructions stored in the data storage after the recordable meeting has ended.

8. The method of claim 1, wherein the step of forming a text from the recordable meeting is performed using a voice to text recognition algorithm.

9. The method of claim 1, wherein the communication comprises content selected from the group consisting of a lecture material, a verbal utterance, a movie, music, a television program, and a telecommunication for the deaf.

10. The method of claim 1, wherein the text is an abstract, an agenda, a document with images, text based meeting minutes, a video with text, a slide-like presentation, or combinations thereof.

11. The method of claim 1, wherein the at least one pointer comprises a time stamp.

12. The method of claim 1, wherein the recording server is a multipoint control unit comprising a teleconferencing bridge for adding communications to the recordable meeting enabling multiple communications to occur simultaneously.

13. A system for recording and retrieving information from a linearly progressing communication over a network, the system comprising:
  a. computer means for storing a linearly progressing communication, wherein the computer means comprises a processor with a memory;
  b. computer instructions for assigning an identification code for linearly progressing communication, wherein the identification code is generated prior to the linearly progressing communication from information pertinent to the linearly progressing communication,
    wherein the information comprises abstracts of technical talks;
  c. computer instructions for forming a text from the linearly progressing communication, wherein the text is a transcript of the linearly progressing communication;
  d. a pointer adapted for insertion into the text, to identify a corresponding segment of the text, wherein a location of the pointer is selected based on a content of the text;
  e. computer instructions for searching for the pointer; and
  f. computer instructions for playing back a segment of the linearly progressing communication corresponding to the segment of the text identified by a selection of the pointer by a user.

14. The system of claim 13, further comprising second computer means for generating a user interface adapted to topically index the linearly progressing audio and/or visual communication and provide access to the segment of the linearly progressing communication, wherein the pointer corresponds to a beginning of a subject topically indexed.

15. The system of claim 13, wherein the pointer is inserted during the recording of a meeting by a participant in the meeting.

16. The system of claim 13, further comprising computer instructions for inserting a time stamp when the pointer is inserted in the linearly progressing communication.

17. The system of claim 13, wherein the processor inserts the pointer automatically during the recording of the meeting using computer instructions stored in a data storage.

18. The system of claim 13, wherein the pointer is mapped to a recorded meeting after a recorded meeting has ended using computer instructions stored in a data storage in communication with the processor.

19. The system of claim 13, wherein the linearly progressing communication is a conference call.

20. A computer readable medium having stored thereon a plurality of instructions, the plurality of instructions including instructions which, when executed by a processor, cause the processor to perform the steps of:
  a. providing a communication via the network to a recording server adapted for hosting a recordable meeting, wherein the recording server comprises a processor with a memory;
  b. assigning an identification code for the recordable meeting, wherein the identification code is generated prior to the recordable meeting from information pertinent to the recordable meeting,
    wherein the information comprises abstracts of technical talks;
  c. forming a text from the recordable meeting and storing the text in a data storage, wherein the text is a transcript of the recordable meeting;
  d. inserting at least one pointer into the text to form a recorded meeting with at least one pointer, wherein the at least one pointer maps the text to form a mapped text, and wherein a location of the pointer is selected based on a content of the text;
  e. saving the mapped text with the identification code in the data storage; and
  f. playing back a portion of the recordable meeting using at least one pointer in the mapped text.

21. The method of claim 1, wherein the information used to generated the identification code comprises meeting agendas.

* * * * *